(12) United States Patent
Martin et al.

(10) Patent No.: US 6,522,708 B1
(45) Date of Patent: Feb. 18, 2003

(54) SEAL ARRANGEMENT FOR IN-CORE INSTRUMENT HOUSING

(75) Inventors: Kenneth A. Martin, Windsor, CT (US); James G. Tursi, Glastonbury, CT (US); Joseph M. Burger, Windsor, CT (US); Kurt R. Graeff, Windsor, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/818,534

(22) Filed: Mar. 28, 2001

Related U.S. Application Data (60) Provisional application No. 60/194,028, filed on Apr. 3, 2000.

(51) Int. Cl.[7] .............................................. G21C 13/028
(52) U.S. Cl. ..................... 376/204; 376/203; 376/205; 376/245; 376/450; 376/451; 285/95; 277/396; 277/516; 277/580; 277/593; 277/595; 277/591; 277/609; 277/915; 277/925
(58) Field of Search ................. 376/203, 204, 376/205, 245, 451, 450; 285/95; 277/396, 516, 580, 593, 595, 591, 609, 915, 925

(56) References Cited

U.S. PATENT DOCUMENTS

| | | | | |
|---|---|---|---|---|
| 4,605,202 A | * | 8/1986 | Tsuno et al. | 251/315.05 |
| 4,723,795 A | * | 2/1988 | Shenoy | 285/123.12 |
| 4,728,479 A | * | 3/1988 | Merkovsky | 285/111 |
| 4,945,623 A | * | 8/1990 | Porter | 29/402.07 |
| 4,986,954 A | * | 1/1991 | Feurgard | 376/203 |
| 4,996,018 A | * | 2/1991 | Bhatt et al. | 376/203 |
| 5,805,651 A | * | 9/1998 | Malmasson | 376/203 |
| 6,318,766 B1 | * | 11/2001 | Babuder et al. | 277/609 |

FOREIGN PATENT DOCUMENTS

| | | | |
|---|---|---|---|
| EP | 0346170 | * | 12/1989 |
| GB | 0959700 | * | 6/1964 |
| GB | 0996228 | * | 6/1965 |
| GB | 2265249 A | * | 9/1993 |
| JP | 406050431a | * | 2/1994 |

* cited by examiner

*Primary Examiner*—Michael J. Carone
*Assistant Examiner*—John Richardson (57) ABSTRACT

A seal arrangement for providing a seal between a nuclear reactor in-core instrument housing and an instrument contained within the housing includes a lower seal assembly surrounding an outer portion of the in-core instrument housing, an upper seal assembly surrounding an outer portion of the in-core instrument, a seal housing enclosing the lower and upper seal assemblies, and lower and upper compression assemblies positioned on respective ends of the seal housing. The compression assemblies each include a drive nut and a compression collar. The compression collars engage and apply an axial load on the seal assemblies to maintain a reliable seal between the seal housing and the outer portion of the in-core instrument housing, and between the seal housing and the outer portion of the in-core instrument.

16 Claims, 5 Drawing Sheets

SEAL ARRANGEMENT FOR IN-CORE INSTRUMENT HOUSING

RELATED APPLICATIONS

This application claims the benefit of U.S. Provisional Application No. 60/194,028 filed on Apr. 3, 2000.

BACKGROUND OF THE INVENTION

1. Field of the Invention

The present invention relates generally to nuclear power reactors, and more particularly, to a seal arrangement and method for sealing an in-core instrument housing ("ICI housing") after reinsertion of an in-core instrument ("ICI") during a refueling outage.

2. Description of the Related Art

On typical pressurized water nuclear reactors, a plurality of nozzles are located in an organized pattern across the head of a reactor vessel. A majority of the nozzles are used to provide a pressure boundary between neutron absorbing control rods and respective drive mechanisms which provide controlling motion to the control rods. A smaller number of the nozzles are used to provide access into the vessel for ICIs, such as thermocouples and the like.

At every refueling outage for typical nuclear reactors, the ICIs must be partially withdrawn to allow for movement of the fuel. In some cases, the process of withdrawing the ICIs has resulted in damage to the O-ring sealing surfaces of the ICIs and/or the ICI seal housing. In some cases, the sealing surfaces are damaged beyond repair and, because the ICIs have to be reinserted with a reliable seal prior to restarting, the damage must be repaired or an alternate sealing method used.

One currently available option to repair the damaged seal is to reinsert the ICIs without the O-rings, and perform a field seal weld of the ICI to the housing. However, this requires costly and time-consuming field welding. Also, at the next refueling outage, the seal weld must be machined out so that the ICI can be withdrawn, reinserted, and again seal welded. These operations are very time consuming and costly and can only be performed a few times before an alternate method must be used.

Another currently available option to repair the damaged seal is to withdraw the ICI completely and replace the damaged parts. However, because of high radiation contamination, there currently are no methods available to remove the ICI without cutting it up and disposing of the pieces underwater during the withdrawal process. Thus, even a working, undamaged ICI must be discarded and replaced, which is very costly. Moreover, replacement of the seal housing requires field cutting and ASME Code welding, which are very time consuming and costly.

Thus, there is a need for an improved seal arrangement and method for sealing ICI housings after reinsertion of the ICIs during a refueling outage.

SUMMARY OF THE INVENTION

It is an object of the present invention to provide a seal arrangement. and method for resealing an ICI housing during a refueling outage that allows use of the existing components and minimizes the need for costly field cutting and/or welding, and which can be assembled and disassembled quickly and easily and reused over the life of the plant.

It is a further object of the present invention to provide a seal arrangement for sealing an ICI housing which is economical, efficient and reliable in use, capable of a long operating life, and particularly well adapted for the proposed use.

The present invention provides a seal arrangement for establishing a seal between a nuclear reactor ICI housing and an ICI contained within the ICI housing. The seal arrangement includes a lower seal assembly surrounding an outer portion of the ICI housing, an upper seal assembly surrounding an outer portion of the ICI, a seal housing enclosing the lower and upper seal assemblies, and lower and upper compression assemblies positioned on respective ends of the seal housing. The compression assemblies each include a drive nut and a compression collar. The compression collars engage and apply an axial load on the seal assemblies to maintain a reliable seal between the seal housing and the outer portion of the ICI housing, and between the seal housing and the outer portion of the ICI. Variations in the construction and methods for installing the seal arrangements to the ICI housing. and ICI are disclosed.

According to a broad aspect of the present invention, a seal arrangement for a nuclear reactor ICI housing is provided, comprising: a first seal assembly surrounding an outer portion of an ICI housing; a second seal assembly surrounding an outer portion of an ICI inserted within the ICI housing; a seal housing having first and second ends, the seal housing enclosing the first and second seal assemblies; and first and second compression assemblies positioned on and engaging the first and second ends of the seal housing, respectively.

According to another broad aspect of the present invention, a seal arrangement is provided in combination with a nuclear reactor ICI housing and an ICI inserted within the ICI housing. The seal arrangement comprises: a first seal assembly surrounding an outer portion of the ICI housing; a second seal assembly surrounding an outer portion of the ICI; a seal housing having first and second ends, the seal housing enclosing the first and second seal assemblies; and first and second compression assemblies positioned on the first and second ends of the seal housing, respectively. The first compression assembly engages the first seal assembly to maintain a seal between the first end of the seal housing and the outer portion of the ICI housing. The second compression assembly engages the second seal assembly to maintain a seal between the second end of the seal housing and the outer portion of the ICI.

According to another broad aspect of the present invention, a method of sealing a nuclear reactor ICI housing is provided, comprising the steps of: positioning a first compression assembly and first seal assembly around an outer portion of the ICI housing; positioning a seal housing over an end of the ICI housing; positioning a second seal assembly and second compression assembly around an outer portion of an ICI contained within the ICI housing; and threading respective drive nuts of the first and second compression assemblies onto the seal housing to maintain a compressive sealing force against the first and second seal assemblies.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A seal arrangement and method for sealing an ICI housing according to the present invention will now be explained in detail with reference to FIGS. 1 to 8 of the drawings.

Figure 1:
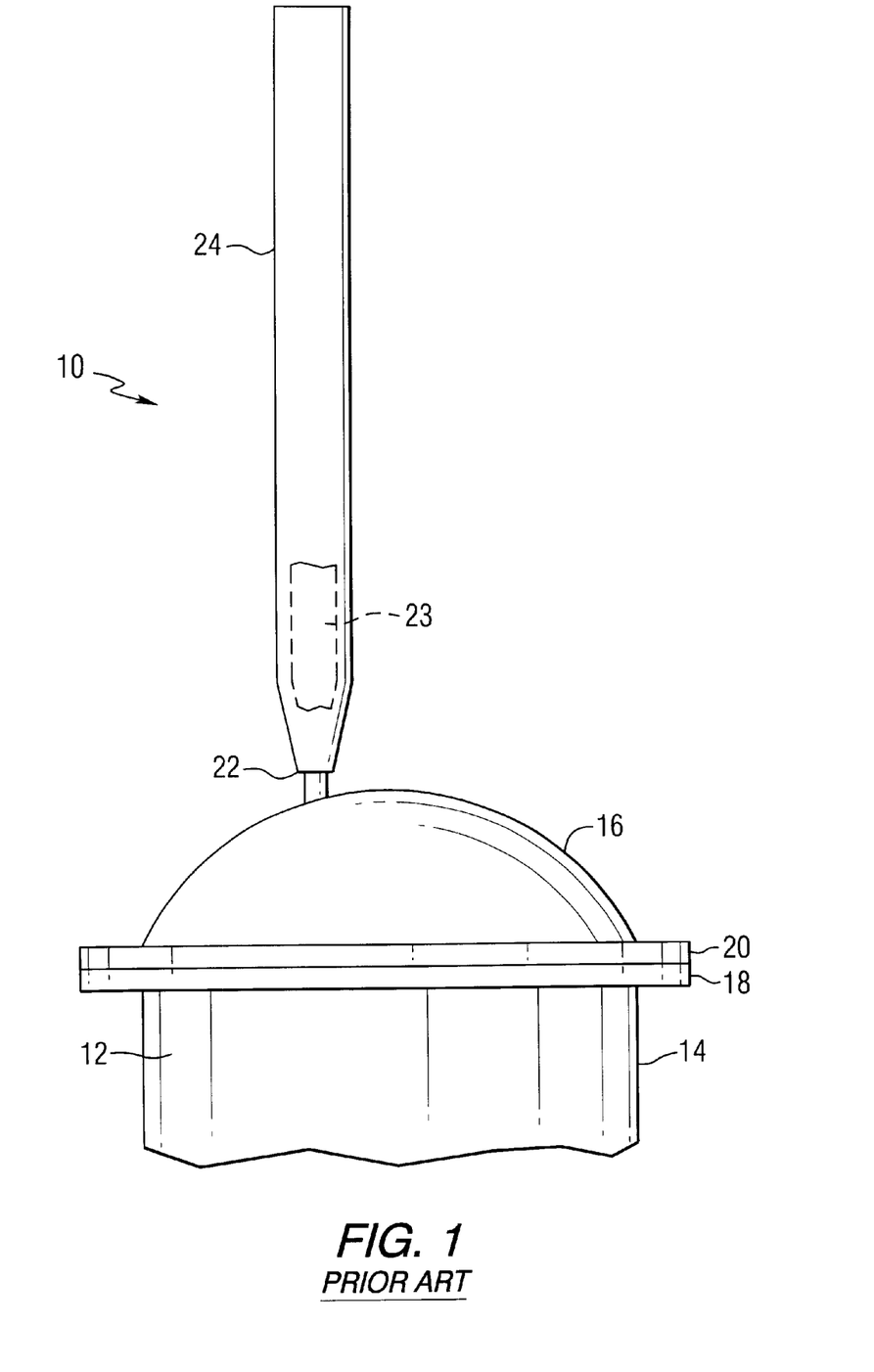
FIG. 1 is a schematic elevation view of the upper portion of a nuclear reactor vessel, showing a conventional ICI housing connected to a reactor vessel nozzle extending from the reactor vessel head.

FIG. 1 shows a portion of a nuclear reactor system 10 having a reactor 12 including a substantially upright cylindrical vessel 14 and a substantially hemispherical head 16. The vessel has an upper flange 18, and the head 16 has a lower flange 20. The flanges 18 and 20 are bolted together in a known manner for normal operation of the reactor system 10. As is well known in the field of nuclear engineering, the operating conditions within the reactor 12 can be monitored by ICIs, such as thermocouples and so forth. This is typically accomplished by a plurality of ICIs 23 that pass through respective nozzles 22 into the reactor 12. For the purpose of simplifying the present description, only one of the reactor vessel nozzles 22 on the head 16 is shown, but it should be appreciated that normally there are several nozzles 22 positioned in an organized array across the head 16. Each ICI 23 is housed in an ICI housing 24 connected to a respective one of the nozzles 22. The ICI 23, ICI housing 24, and other components shown in FIG. 1 are conventional.

As explained above, the ICIs 23 must be partially withdrawn at every refueling outage to allow for movement of the fuel, The process of withdrawing the ICIs 23 often results in damage to the sealing surfaces of the O-rings installed in the grooves 25 (FIG. 2) of the ICIs 23 and/or to the ICI seal housing 24. The present invention provides seal arrangements for resealing the interface between the ICI 23 and the ICI housing 24 after the ICIs 23 are reinserted following the refueling.

Three embodiments of seal arrangements according to the present invention are described herein and shown in FIGS. 2 to 8 of the drawings. All three embodiments utilize external seal rings, preferably made of a graphite material, on the external surfaces of the existing ICI 23 and ICI housing 24. To effect a seal against full system design pressure of up to 2500 psi, the seal rings must be compressed under very high loads to prevent leakage. The sealing principle is the same in each of the three embodiments. The method used to compress the seal rings differs.

Figure 2:
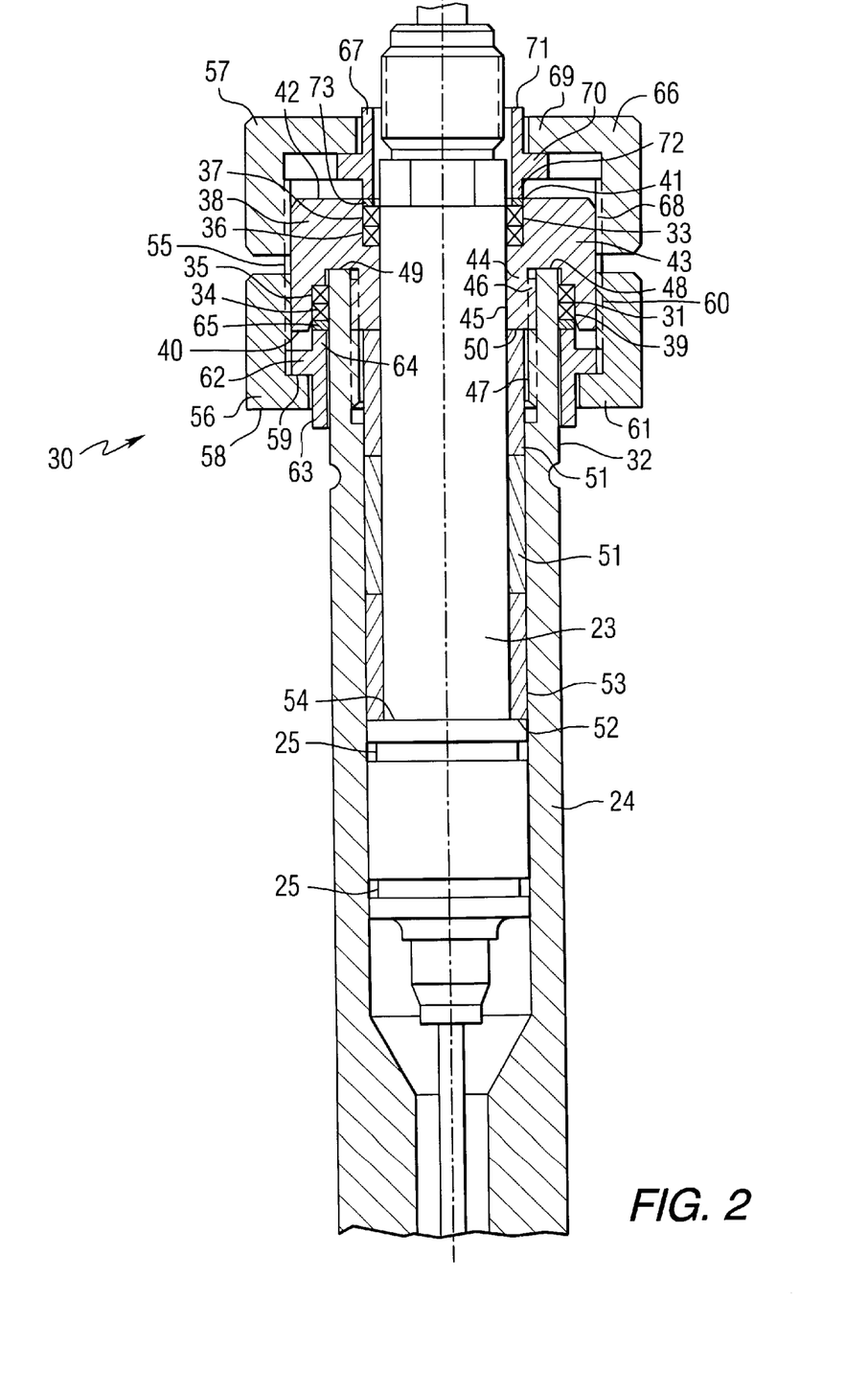
FIG. 2 shows a cross-sectional elevation view of a seal arrangement for an ICI housing according to a first embodiment of the present invention.
Figures 3, 4:
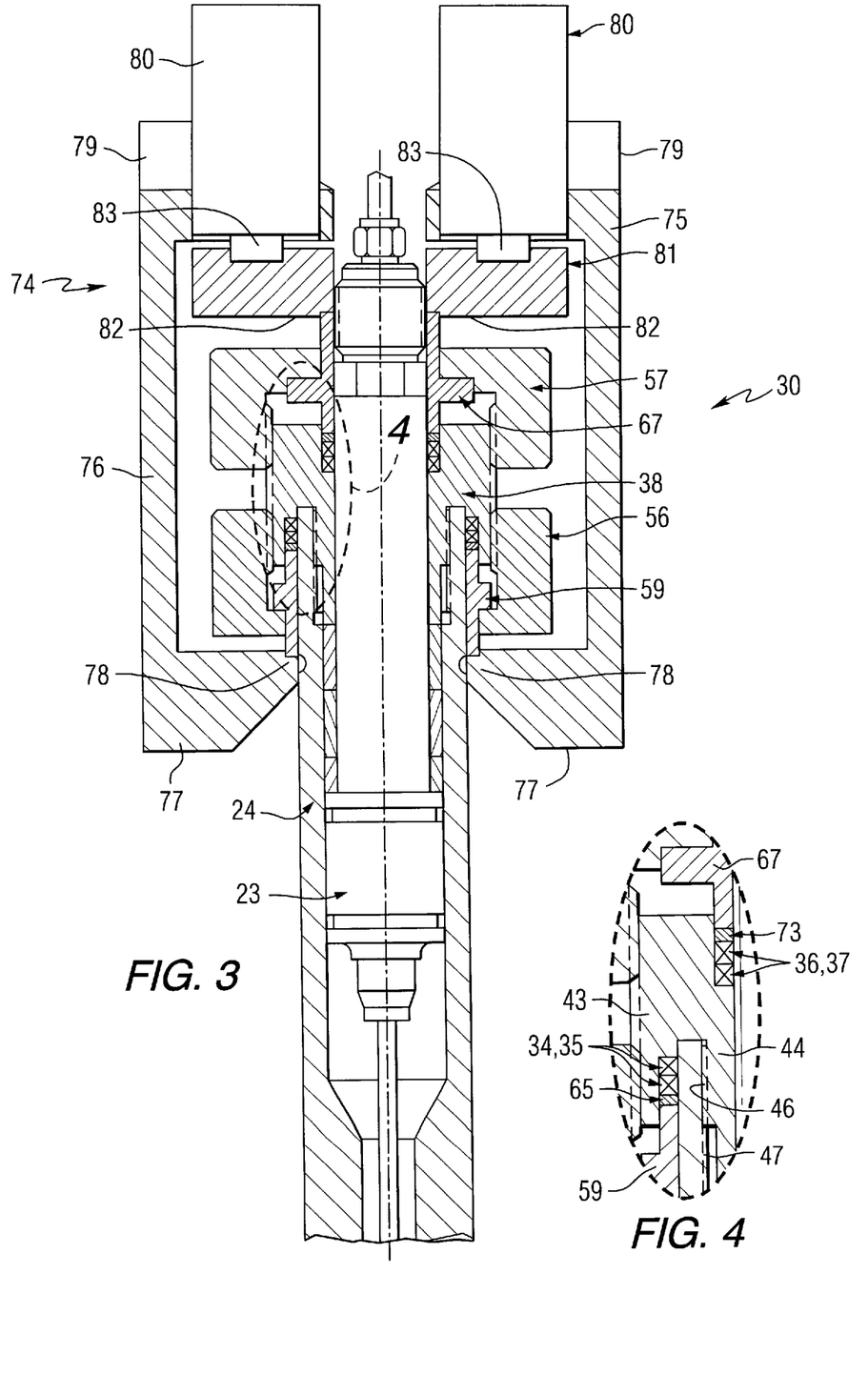
FIG. 3 shows a cross-sectional elevation view of the seal arrangement of FIG. 2 with a compression tool for preloading the seal arrangement during installation.
FIG. 4 shows an enlarged section view of a sealing portion of the seal arrangement of FIGS. 2 and 3.

As shown in FIGS. 2 to 4, a seal arrangement 30 according to the first embodiment of the present invention includes a first lower seal assembly 31 surrounding an outer portion 32 of the ICI housing 24, and a second upper seal assembly 33 surrounding an outer portion of an ICI 23 contained within the ICI housing 24. The lower seal assembly 31 includes a first pair of seal rings 34, 35 positioned in abutting relationship with each other. The upper seal assembly 33 includes a second pair of seal rings 36, 37 positioned in abutting relationship with each other. The seal rings 34, 35 of the lower seal assembly 31 have an inside diameter that fits closely to the external surface of the ICI housing 24. The seal rings 36, 37 of the upper seal assembly 33 have an inside diameter that fits closely to the external surface of the ICI 23. The seal rings 34–37 are preferably fabricated of a graphite material.

A seal housing 38 is provided which spans the interface between the ICI 23 and the ICI housing 24. The seal housing 38 has a first recess 39 formed in a first lower end 40 and a second recess 41 formed in a second upper end 42. The lower seal assembly 31 is positioned in the first recess 39 so as to be enclosed by the lower end 40 of the seal housing 38. The upper seal assembly 33 is positioned in the second recess 41 so as to be enclosed by the upper end 42 of the seal housing 38.

The seal housing 38 has a housing portion 43 and an integral retainer portion 44. The retainer portion 44 has an inner diameter 45 that fits closely around the external surface of the ICI 23, and an outer diameter having external male threads 46. The retainer portion 44 is secured to the ICI housing 24 by threadably engaging the external threads 46 of the retainer portion 44 to corresponding internal threads 47 formed in the upper end of the ICI housing 24. The retainer portion 44 has an abutment seat 48 at the top of the external threads 46 that engages and seats against an upper end surface 49 of the ICI housing 24. A lower end of the retainer portion 44 has an abutment surface 50 against which the existing spacers 51 surrounding the ICI 23 can be engaged. A lower end 52 of the lowest spacer 53 is engaged by an annular shoulder 54 formed on the ICI 23. Thus, the retainer portion 44 provides positive retention against slipping of the ICI 23 and other parts relative to the ICI housing 24 when system pressure is applied.

The housing portion 43 of the seal housing 38 is molded together with the retainer portion 44 in a single, integral piece. The housing portion 43 has external male threads 55 on each end, which threads may extend along the entire length of the housing portion 43, as shown in FIG. 2. The seal housing 38 is preferably fabricated from a stainless steel alloy that resists galling and seizing of threads, such as NITRONIC 60™ Stainless Steel.

A first lower compression assembly 56 and a second upper compression assembly 57 are positioned on the lower and upper ends 40, 42 of the seal housing 38, respectively. The lower compression assembly 56 includes a first lower drive nut 58 and a first lower compression collar 59. The lower drive nut 58 has internal threads 60 threadably engaged on the external threads 55 of the housing portion 43, and a flange 61 that extends inwardly at a lower end. The lower compression collar 59 has a first annular portion 62 engageable by the flange 61 of the lower drive nut 58, a second annular portion 63 which extends through the flange 61 and protrudes from a lower end of the lower drive nut 58, and a third annular portion 64 facing the lower seal assembly 31. A first lower spacer ring 65 is positioned between the third annular portion 64 and the seal rings 34, 35 of the lower seal assembly 31. The lower compression collar 59 is axially movable against the lower spacer ring 65 using a compression tool, which will be described below, to compress the lower seal assembly 31 to form a seal between the ICI housing 24 and the seal housing 38. The lower drive nut 58 is threaded onto the housing portion 43 of the seal housing 38 until the flange 61 is engaged snugly against the first annular portion 62 of the lower compression collar 59 to maintain the compressed seal between the ICI housing 24 and the seal housing 38.

The upper compression assembly 57 includes a second upper drive nut 66 and a second upper compression collar 67. The upper drive nut 66 has internal threads 68 threadably engaged on the external threads 55 at the upper end of the housing portion 43, and a flange 69 that extends inwardly at an upper end of the upper drive nut 66. The upper compression collar 67 has a first annular portion 70 engageable by the flange 69 of the upper drive nut 66, a second annular portion 71 which extends through the flange 69 and protrudes from an upper end of the upper drive nut 66, and a third annular portion 72 facing the upper seal assembly 33. A second upper spacer ring 73 is positioned between the third annular portion 72 of the upper compression collar 67 and the seal rings 36, 37 of the upper seal assembly 33. The upper compression collar 67 is axially movable against the upper spacer ring 73 using a compression tool, which will be described below, to compress the upper seal assembly 33 to form a seal between the ICI 23 and the seal housing 24. The upper drive nut 66 is threaded onto the housing portion 43 of the seal housing 38 until the flange 69 is engaged snugly against the first annular portion 70 of the upper compression collar 67 to maintain the compressed seal between the ICI 23 and the seal housing 38.

As shown in FIG. 2, the diameters of the threaded portions 60, 68 of the lower and upper drive nuts 58, 66 are the same. The inner diameter of the flange 69 of the upper drive nut 66 and the corresponding portions of the upper compression collar 67 are smaller than the inner diameter of the flange 61 of the lower drive nut 58 and the corresponding portions of the lower compression collar 59.

An installation tool 74 for installing the seal arrangement 30 shown in FIG. 2 over the existing ICI 23 and ICI housing 24 during a refueling outage is shown in FIG. 3. The installation tool 74 includes a pair of leg assemblies 75, 76 each having a lower end 77 with a gripping portion 78 protruding inwardly toward the ICI housing 24, and an upper end 79 supporting a hydraulic cylinder 80. The gripping, portions 78 at the lower end 77 of the leg assemblies 75, 76 engage the protruding second annular portion 63 of the lower compression collar 59. The pair of leg assemblies 75, 76 can be easily positioned over and removed from the seal arrangement 30 after the compression assemblies 56, 57 are installed with the drive nuts 58, 66 threaded hand tight.

The installation tool 74 also includes an upper compression plate 81 surrounding the ICI 23 above the upper compression collar 67. A lower surface 82 of the compression plate 81 engages the protruding second annular portion 71 of the upper compression collar 67. A piston 83 protrudes from each of the hydraulic cylinders 80 into engagement with the upper compression plate 81. When the tool 74 is placed over the seal arrangement 30, as shown in FIG. 3, a predetermined pressure can be introduced into the hydraulic cylinders 80 to force the respective pistons 83 against the upper compression plate 81, which in turn pushes the upper compression collar 67 against the upper seal assembly 33. At the same time, a corresponding force is transmitted through the leg assemblies 75, 76 to force the gripping portions 78 against the lower compression collar 59 to compress the lower seal assembly 31. The tool 74 is thus operable to provide a compression load to the lower and upper seal assemblies 31, 33 simultaneously.

While the tool 74 is installed and a compression preload is applied to the seal assemblies 31, 33, the lower and upper drive nuts 58, 66 can be threaded further along the seal housing 38 until the flanges 61, 69 of the drive nuts 58, 66 are engaged snugly against the respective lower and upper compression collars 59, 67. For example, the drive nuts 58, 66 can be seated hand tight while the seal assemblies 31, 33 are under compression from the installation tool 74. When the hydraulic pressure is released from the tool 74, the drive nuts 58, 66 pick up the load and maintain the compression preload on the seal assemblies 31, 33.

Having explained the construction of the seal arrangement 30 according to a first embodiment of the present invention, a method of installing the seal arrangement 30 during a nuclear reactor refueling outage will now be described.

After the seal welds have been cut (where applicable) and the surfaces cleaned, the existing retainer nut (not shown) is removed and discarded. The ICI 23 is partially withdrawn in accordance with existing procedures. The existing ICI O-rings in the grooves 25 can be discarded because they are not required with the seal arrangement 30 of the present invention. The refueling is then completed in accordance with existing procedures. The ICI 23 is then reinserted to the proper depth. The reinsertion can be done by hand without using an insertion tool because the grooves 25 do not have O-rings causing a friction drag during reinsertion. Spacers 51 are added according to the existing procedure to a defined height so that the seal housing 38 will seat properly.

The lower drive nut 58, lower compression collar 59, lower spacer ring 65. and lower seal assembly 31 are lowered over the outside of the ICI housing 24. The retainer portion 44 of the seal housing 38 is threaded (e.g., hand tight) into the internal threads 47 of the ICI housing 24 until the seal housing 38 is seated on the ICI housing 24. After the seal housing 38 is installed, the ICI 23 is pulled up slightly by hand to close any gaps with the spacers 51. The lower seal assembly 31, lower spacer ring 65, lower compression collar 59 and lower drive nut 58 are then installed to the lower end 40 of the seal housing 38 (e.g., hand tight), as shown in FIG. 2. The upper seal assembly 33 and upper spacer ring 73 are installed in the upper end 42 of the seal housing 38. The upper compression collar 67 and upper drive nut 66 are then installed (e.g., hand tight), as shown in FIG. 2.

The installation tool 74 shown in FIG. 3 is used to seat the lower and upper seal assemblies 31, 33, preload the seal arrangement 30 during installation, and unload the seal arrangement 30 for removal. Because the tool 74 loads both seal assemblies 31, 33 simultaneously, the number of operations required to install or remove the seal arrangement 30 is reduced, thereby saving installation and removal time.

The upper and lower compression collars 59, 67 are axially loaded simultaneously by the hydraulic tool 74 to compress the lower and upper seal assemblies 31, 33 to the desired preload. While under compression with the hydraulic tool 74, both drive nuts 58, 66 are seated (e.g., hand tight). When the hydraulic pressure is released from the tool 74, the drive nuts 58, 66 pick up the load and maintain the preload on the seal assemblies 31, 33. The tool 74 can then be removed.

A seal arrangement 85 according to a second embodiment of the invention will now be described with reference to FIG. 5.

Figure 5:
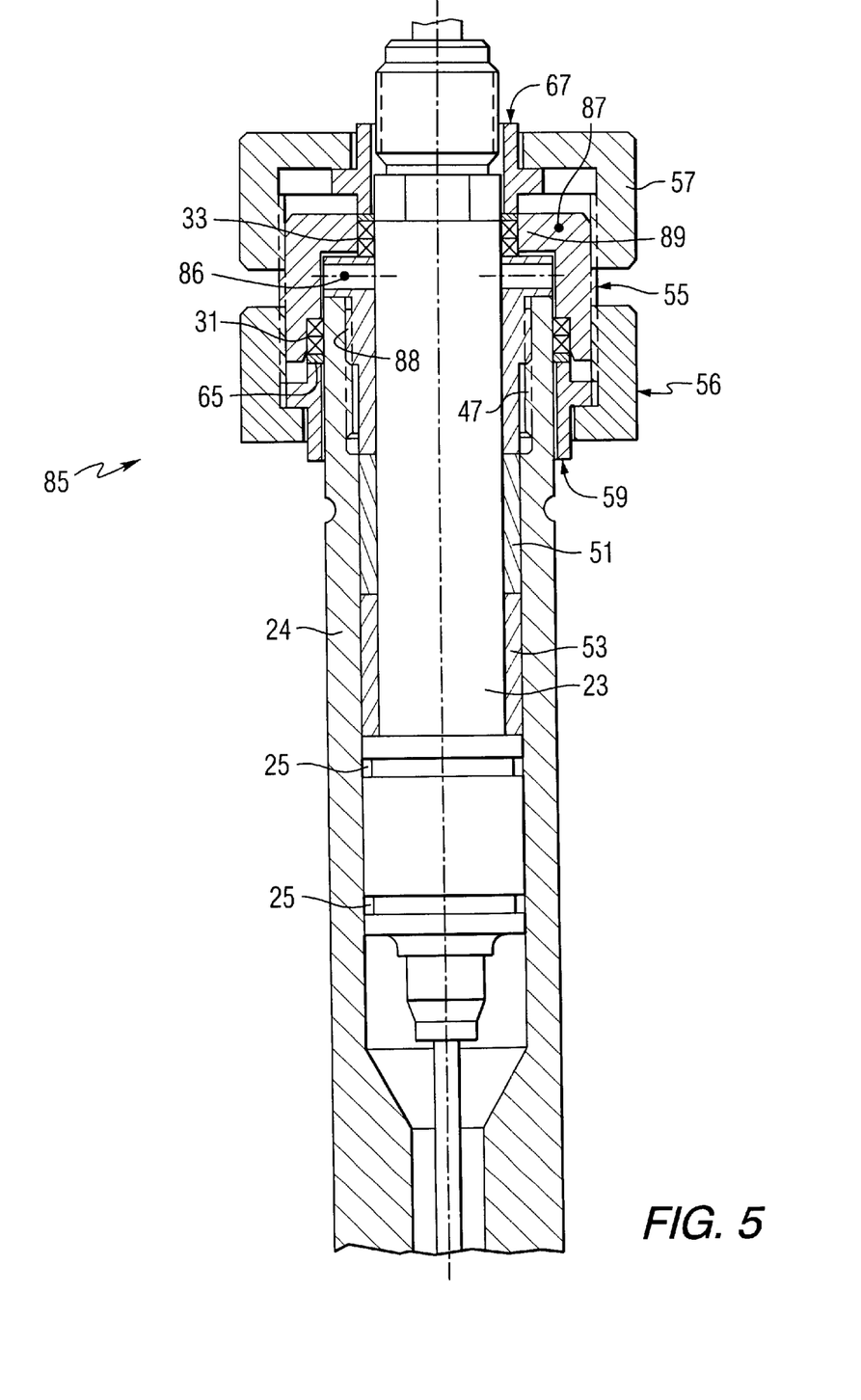
FIG. 5 shows a cross-sectional elevation view of a seal arrangement for an ICI housing according to a second embodiment of the present invention.

The seal arrangement 85 shown in FIG. 5 is similar in most respects to the seal arrangement 30 shown in FIGS. 2 to 4. The main difference is that the seal arrangement 85 of FIG. 5 includes a retainer nut 86 as a separate component from the seal housing 87. The retainer nut 86 has external threads 88 which are threaded into the internal threads 47 of the ICI housing 24 until the retainer nut 86 is seated against the upper end of the ICI housing 24. The seal housing 87 is installed over the retainer nut 86 after the retainer nut 86 is seated in the ICI housing 24. An inwardly directed flange 89 at the upper end of the seal housing 87 engages an upper surface of the retainer nut 86 to maintain the vertical positioning of the seal housing 87. The seal housing 87 and retainer nut 86 are both preferably fabricated from a stainless steel alloy that resists galling and seizing of threads, such as NITRONIC™ 60 Stainless Steel. The installation tool 74 shown in FIG. 3 is used for installing and removing the seal arrangement 85 of FIG. 5 in the same manner described above.

A seal arrangement 90 according to a third embodiment of the invention will now be described with reference to FIGS. 6 to 8.

Figures 6, 7, 8:
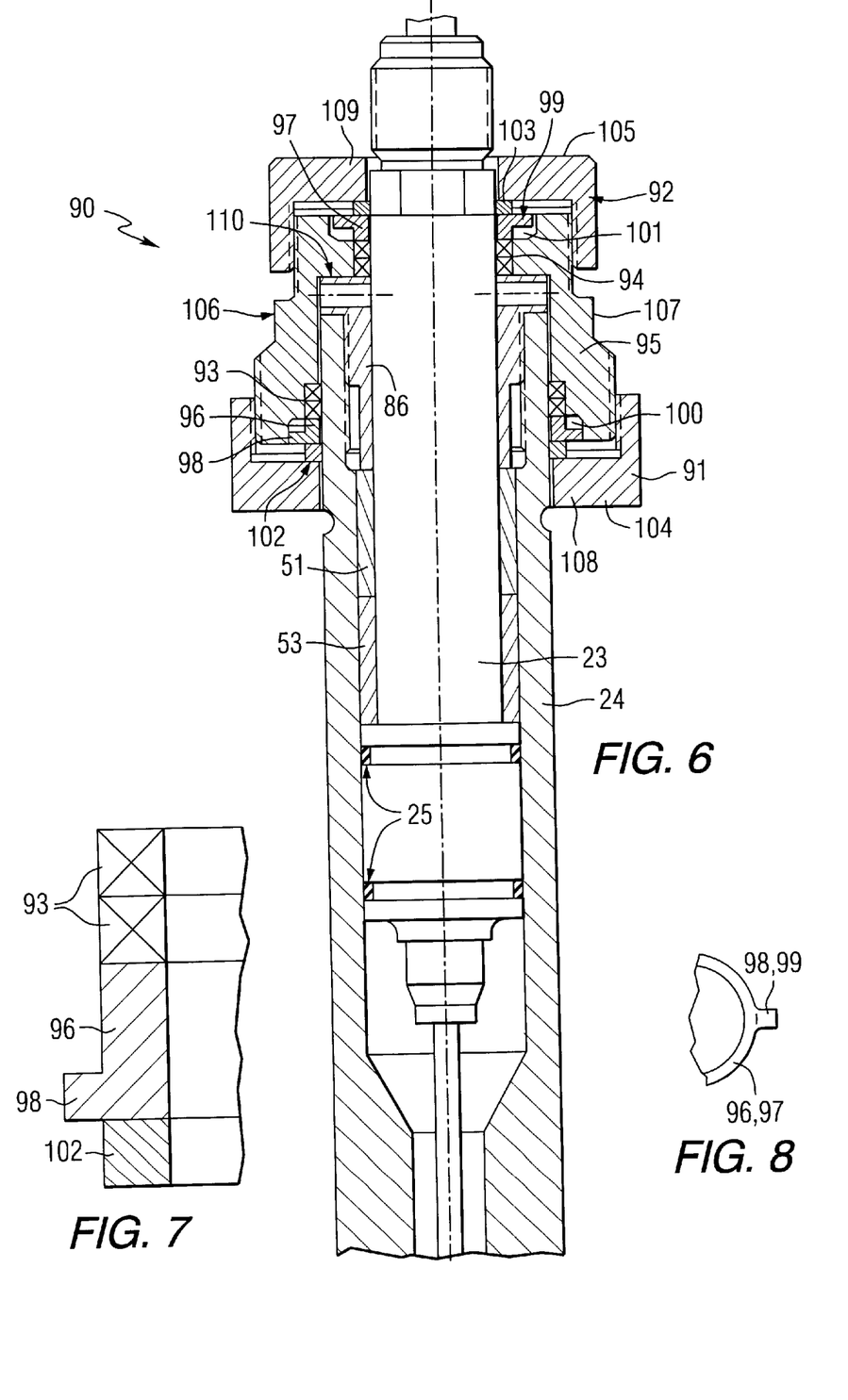
FIG. 6 shows a cross-sectional elevation view of a seal arrangement for an ICI housing according to a third embodiment of the present invention.
FIG. 7 shows an enlarged section view of a sealing portion of the seal arrangement of FIG. 6.
FIG. 8 is a plan view of a portion of a compression collar having an anti-rotation key used in the seal arrangement of FIG. 6.

The seal arrangement 90 shown in FIGS. 6 to 8 is similar in many respects to the seal arrangement 85 shown in FIG. 5. The main difference is that the seal arrangement 90 of FIGS. 6 to 8 relies upon the torque applied to the lower and upper drive nuts 91, 92 to compress and load the lower and upper seal assemblies 93, 94 during installation, rather than a hydraulic installation tool.

The seal arrangement 90 of FIGS. 6 to 8 includes a first lower seal assembly 93 enclosed by a lower end of a seal housing 95, and a second upper seal assembly 94 enclosed by an upper end of the seal housing 95. A first lower compression collar 96 and a second upper compression collar 97 are installed against the respective lower and upper seal assemblies 93, 94. The lower and upper compression collars 96, 97 each have anti-rotation keys 98, 99 protruding radially outwardly, as shown in FIG. 8, for example. The lower and upper ends of the seal housing 95 have mating keyways 100, 101 formed therein into which the anti-rotation keys 98, 99 of the compression collars 96, 97 are received. The compression collars 96, 97 act as a bearing surface for the applied thrust loads and prevent rotational loads on the seal rings of the respective seal assemblies 93, 94.

Thrust bearing rings 102, 103 are installed between each of the drive nuts 104, 105 and the respective compression collars 96, 97. The thrust bearing rings 102, 103 reduce the rotational frictional drag as the drive nuts 104, 105 are tightened. The thrust bearing rings 102, 103 can be eliminated if the compression collars 96, 97 are fabricated of a good bearing material.

The seal housing 95 has at least a pair of flat surfaces 106, 107 formed intermediate its ends on an external perimeter for engagement by a wrench (not shown) to prevent rotation during torquing of the upper and lower drive nuts 104, 105. For example, the external perimeter of the seal housing 95 can be hexagonal shaped. As shown in FIG. 6, the diameter of the threaded portion of the lower drive nut 104 is larger than the diameter of the threaded portion of the upper drive nut 105. The inner diameter of the flange 108 of the lower drive nut 104 and the corresponding portions of the lower compression collar 96 are also larger than the inner diameter of the flange 109 of the upper drive nut 105 and the corresponding portions of the upper compression collar 97.

A method of installing the seal arrangement 90 of FIGS. 6 to 8 will now be described.

As in the embodiments described above, the existing O-rings in the grooves 25 on the ICI 23 can be removed and discarded because they are not required with the seal arrangement 90 of the present invention. After the refueling is completed, the ICI 23 is reinserted to a proper depth. Spacers 51 are added according to the existing procedure to a defined height. The retainer nut 86 is then seated in the upper end of the ICI housing 24.

The lower drive nut 104, lower thrust bearing ring 102, lower compression collar 96, and seal rings of the lower seal assembly 93 are lowered over the outside of the ICI housing 24. The seal housing 95 is then placed over the retainer nut 86 with its upper flange 110 seated against the upper surface of the retainer nut 86. The lower seal assembly 93, lower compression collar 96, lower thrust bearing ring 102, and lower drive nut 104 are then installed to the lower end of the seal housing 95. The lower drive nut 104 is torqued using a wrench (not shown) until a sufficient load is placed on the lower seal assembly 93 to prevent leakage under full system pressure. A second wrench (not shown) is used to engage the flat surfaces 106, 107 on the seal housing 95 to prevent rotation of the seal housing 95 when the lower drive nut 104 is being torqued.

The upper seal assembly 94, upper compression collar 97, and upper thrust bearing ring 103 are then installed over the ICI 23 and seated into the upper end of the seal housing 95. While pulling the ICI 23 up slightly by hand to close any gaps with the spacers 51, the upper drive nut 105 is threaded onto the upper end of the seal housing 95 and torqued using a wrench until a sufficient load is placed on the upper seal assembly 94 to prevent leakage under full system pressure.

The seal arrangements 30, 85, 90 described above provide the following advantages over the existing technology: (1) no field cutting or welding are required; (2) the existing ICIs and ICI housings can be reused, even with damaged O-ring sealing surfaces; (3) the seal assemblies will seal the expected pressure without machining or polishing the existing parts; (4) the seal arrangements can be assembled quickly and easily by hand; (5) the ICIs do not need to be withdrawn any further than normal to install the seal arrangements; (6) the existing O-rings can be eliminated making the ICI removal and insertion process easier; (7) the seal arrangements can be fit and installed into smaller areas of access; and (8) the seal arrangements can be reused throughout the life of the plant.

While the invention has been specifically described in connection with specific embodiments thereof, it is to be understood that this is by way of illustration and not of limitation, and the scope of the appended claims should be construed as broadly as the prior art will permit.

What is claimed is:

1. A seal arrangement for a nuclear reactor in-core instrument housing, comprising:
    a first seal assembly surrounding an outer portion of an in-core instrument housing;
    a second seal assembly surrounding an outer-portion of an in-core instrument inserted within said in-core instrument housing;
    a seal housing having first and second ends, said seal housing enclosing said first and second seal assemblies, said seal housing having external threads engaged with corresponding internal threads of the in-core instrument housing to resist slipping when system pressure is applied; and
    first and second compression assemblies positioned on and threadedly engaging said first and second ends of said seal housing, respectively.

2. The seal arrangement as set forth in claim 1, wherein said first and second compression assemblies compress said first and second seal assemblies to form respective seals between said first end of said seal housing and said outer portion of the in-core instrument housing, and between said second end of said seal housing and said outer portion of the in-core instrument.

3. The seal arrangement as set forth in claim 1, wherein said first seal assembly comprises a first pair of graphite seal rings.

4. The seal arrangement as set forth in claim 3, wherein said second seal assembly comprises a second pair of graphite seal rings.

5. The seal arrangement as set forth in claim 1, wherein said first compression assembly comprises a first threaded drive nut threadably engaged to said first end of said seal housing, and a first compression collar positioned between a flange of said first drive nut and said first seal assembly.

6. The seal arrangement as set forth in claim 5, wherein said second compression assembly comprises a second threaded drive nut threadably engaged to said second end of said seal housing, and a second compression collar positioned between a flange of said second drive nut and said second seal assembly.

7. The seal arrangement as set forth in claim 6, further comprising a first spacer ring positioned between said first compression collar and said first seal assembly, and a second spacer ring positioned between said second compression collar and said second seal assembly.

8. The seal arrangement as set forth in claim 1, wherein said seal housing is fabricated of a stainless steel alloy that resists galling and seizing of threads.

9. The seal arrangement as set forth in claim 1, further comprising a retainer nut having external threads threadably engaged with corresponding internal threads of the in-core instrument housing to resist slipping when system pressure is applied, said retainer nut being separate from said seal housing.

10. The seal arrangement as set forth in claim 1, wherein said first and second compression assemblies comprise first and second drive nuts and first and second compression collars, respectively, said compression collars each having a first portion engageable by one of said drive nuts and a second portion that protrudes axially from said compression assemblies for engagement by an installation tool.

11. The seal arrangement as set forth in claim 1, wherein said first compression assembly comprises a first threaded drive nut threadably engaged to said first end of said seal housing, and a first compression collar positioned between a flange of said first drive nut and said first seal assembly, said first compression collar having an anti-rotation key received in a first mating keyway of said seal housing.

12. The seal arrangement as set forth in claim 11, wherein said second compression assembly comprises a second threaded drive nut threadably engaged to said second end of said seal housing, and a second compression collar positioned between a flange of said second drive nut and said second seal assembly, said second compression collar having an anti-rotation key received in a second mating keyway of said seal,housing.

13. The seal arrangement as set forth in claim 12, wherein said first drive nut has a larger threaded diameter than said second drive nut.

14. In combination, a nuclear reactor in-core instrument housing, an in-core instrument inserted within said instrument housing, and a seal arrangement for providing a seal between said instrument and said instrument housing, the seal arrangement comprising:

a first seal assembly surrounding an outer portion of said in-core instrument housing;

a second seal assembly surrounding an outer portion of said in-core instrument, a seal housing having first and second ends, said seal housing enclosing said first and second seal assemblies, said seal housing having external threads engaged with corresponding internal threads of the in-core instrument housing; and first and second compression assemblies positioned on and threadedly engaged with said first and second ends of said seal housing, respectively, said first compression assembly engaging said first seal assembly to maintain a seal between said first end of said seal housing and said outer portion of said in-core instrument housing, and said second compression assembly engaging said second seal assembly to maintain a seal between said second end of said seal housing and said outer portion of said in-core instrument.

15. The combination as set forth in claim 14, wherein said first and second compression assemblies each comprise a threaded drive nut threadably engaged to said seal housing, and a compression collar positioned between a flange of said drive nut and a respective one of said seal assemblies.

16. The combination as set forth in claim 15, wherein said compression collars each have a first portion engageable by one of said drive nuts and a second portion that protrudes axially from said compression assemblies for engagement by an installation tool.

* * * * *